(12) United States Patent
Qian et al.

(10) Patent No.: US 10,621,992 B2
(45) Date of Patent: Apr. 14, 2020

(54) ACTIVATING VOICE ASSISTANT BASED ON AT LEAST ONE OF USER PROXIMITY AND CONTEXT

(71) Applicant: Lenovo (Singapore) Pte. Ltd., New Tech Park (SG)

(72) Inventors: Ming Qian, Cary, NC (US); Song Wang, Cary, NC (US); John Weldon Nicholson, Cary, NC (US)

(73) Assignee: Lenovo (singapore) pte. ltd., Singapore (SG)

( * ) Notice: Subject to any disclaimer, the term of this patent is extended or adjusted under 35 U.S.C. 154(b) by 0 days.

(21) Appl. No.: 15/217,426

(22) Filed: Jul. 22, 2016

(65) Prior Publication Data

US 2018/0025733 A1 Jan. 25, 2018

(51) Int. Cl.
*G10L 17/22* (2013.01)
*G10L 25/78* (2013.01)
*G06F 3/16* (2006.01)
*G10L 15/22* (2006.01)

(52) U.S. Cl.
CPC ............. *G10L 17/22* (2013.01); *G06F 3/167* (2013.01); *G10L 15/22* (2013.01); *G10L 25/78* (2013.01)

(58) Field of Classification Search
None
See application file for complete search history.

(56) References Cited

U.S. PATENT DOCUMENTS

| 5,612,869 | A | 3/1997 | Letzt et al. |
| 6,616,703 | B1 | 9/2003 | Nakagawa |
| 7,219,062 | B2* | 5/2007 | Colmenarez ............ G10L 15/24 382/100 |
| 7,398,061 | B2 | 7/2008 | Mousseau |
| 7,518,631 | B2* | 4/2009 | Hershey ................... G10L 15/26 348/14.1 |
| 8,441,356 | B1* | 5/2013 | Tedesco ............. G08B 21/0453 340/539.15 |
| 8,660,849 | B2 | 2/2014 | Gruber et al. |
| 8,719,039 | B1* | 5/2014 | Sharifi .................... G10L 15/08 704/275 |

(Continued)

FOREIGN PATENT DOCUMENTS

| CN | 103488401 A | 1/2014 |
| CN | 103811005 B | 1/2017 |
| WO | 2018063619 A1 | 4/2018 |

OTHER PUBLICATIONS

Ming Qian, Song Wang, "Systems and Methods for Activating a Voice Assistant and Providing an Indicator That the Voice Assistant has Assistance to Give", related U.S. Appl. No. 15/217,533, Non-Final Office Action dated Sep. 28, 2017.

(Continued)

*Primary Examiner* — Jonathan C Kim

(74) *Attorney, Agent, or Firm* — John M. Rogitz; John L. Rogitz

(57) ABSTRACT

In one aspect, a device includes a processor, a microphone accessible to the processor, and storage accessible to the processor. The storage bears instructions executable by the processor to, without receiving a user command to enter voice recognition mode, automatically activate the microphone responsive to a determination based on a proximity signal that a user is proximate to the device.

20 Claims, 3 Drawing Sheets

(56) References Cited

U.S. PATENT DOCUMENTS

| | | | |
|---|---|---|---|
| 8,768,712 B1* | 7/2014 | Sharifi | G10L 15/08 704/275 |
| 8,913,004 B1* | 12/2014 | Bozarth | G06K 9/00604 345/156 |
| 8,938,394 B1 | 1/2015 | Faaborg et al. | |
| 9,048,963 B1* | 6/2015 | Paulus | H04H 60/64 |
| 9,112,984 B2* | 8/2015 | Sejnoha | H04M 1/72519 |
| 9,245,527 B2* | 1/2016 | Lindahl | G10L 15/32 |
| 9,256,269 B2* | 2/2016 | Mallinson | G06F 1/3206 |
| 9,257,120 B1* | 2/2016 | Alvarez Guevara | G10L 17/00 |
| 9,263,042 B1* | 2/2016 | Sharifi | G10L 15/08 |
| 9,276,541 B1* | 3/2016 | Froment | H03G 3/32 |
| 9,286,892 B2* | 3/2016 | Mengibar | G10L 15/18 |
| 9,318,107 B1* | 4/2016 | Sharifi | G10L 15/22 |
| 9,318,108 B2 | 4/2016 | Gruber et al. | |
| 9,361,885 B2* | 6/2016 | Ganong, III | G10L 15/22 |
| 9,367,806 B1 | 6/2016 | Cosic | |
| 9,373,321 B2* | 6/2016 | Bapat | G10L 15/06 |
| 9,384,738 B2* | 7/2016 | Foerster | G10L 17/22 |
| 9,407,766 B1 | 8/2016 | Bradley et al. | |
| 9,418,656 B2* | 8/2016 | Foerster | G10L 15/20 |
| 9,423,870 B2* | 8/2016 | Teller | G06F 3/013 |
| 9,424,841 B2* | 8/2016 | Foerster | G10L 15/02 |
| 9,584,946 B1 | 2/2017 | Lyren et al. | |
| 10,068,007 B1 | 9/2018 | Wohlsen et al. | |
| 10,121,494 B1 | 11/2018 | Sundaram et al. | |
| 2002/0077830 A1* | 6/2002 | Suomela | G10L 15/26 704/275 |
| 2003/0055655 A1* | 3/2003 | Suominen | G10L 15/22 704/276 |
| 2004/0044516 A1 | 3/2004 | Kennewick et al. | |
| 2004/0243547 A1 | 12/2004 | Chhatrapati et al. | |
| 2005/0033582 A1* | 2/2005 | Gadd | G06Q 30/02 704/277 |
| 2005/0091684 A1* | 4/2005 | Kawabata | B25J 9/0003 725/35 |
| 2005/0191969 A1 | 9/2005 | Mousseau | |
| 2006/0095331 A1 | 5/2006 | O'Malley et al. | |
| 2008/0181140 A1 | 7/2008 | Bangor et al. | |
| 2008/0224883 A1 | 9/2008 | Mock | |
| 2009/0006100 A1* | 1/2009 | Badger | 704/275 |
| 2009/0140855 A1 | 6/2009 | Shemesh et al. | |
| 2009/0182560 A1* | 7/2009 | White | G10L 15/22 704/235 |
| 2009/0232288 A1 | 9/2009 | Forbes et al. | |
| 2009/0253463 A1 | 10/2009 | Shin et al. | |
| 2009/0313014 A1* | 12/2009 | Shin | G10L 15/22 704/235 |
| 2010/0009719 A1* | 1/2010 | Oh | H04M 1/72583 455/563 |
| 2010/0280983 A1* | 11/2010 | Cho | G06F 3/0346 706/46 |
| 2010/0333045 A1 | 12/2010 | Guéziec et al. | |
| 2011/0004756 A1* | 1/2011 | Caballero | G06F 21/10 713/168 |
| 2011/0045812 A1* | 2/2011 | Kim | G06F 1/1626 455/418 |
| 2011/0153323 A1 | 6/2011 | Kim et al. | |
| 2011/0271194 A1* | 11/2011 | Lin | G06Q 30/0241 715/728 |
| 2011/0301958 A1* | 12/2011 | Brush | G06F 9/451 704/275 |
| 2012/0034904 A1* | 2/2012 | LeBeau | H04M 1/72522 455/414.1 |
| 2012/0220271 A1 | 8/2012 | Goldfarb et al. | |
| 2012/0262592 A1* | 10/2012 | Rabii | H04N 5/23241 348/208.16 |
| 2012/0265535 A1* | 10/2012 | Bryant-Rich | H04M 1/7255 704/270 |
| 2012/0295708 A1* | 11/2012 | Hernandez-Abrego | G06F 3/167 463/36 |
| 2012/0297294 A1* | 11/2012 | Scott | G06F 17/273 715/261 |
| 2012/0299824 A1* | 11/2012 | Hoshuyama | G06F 3/167 345/156 |
| 2013/0005405 A1* | 1/2013 | Prociw | H04M 1/72519 455/566 |
| 2013/0021459 A1* | 1/2013 | Vasilieff | G10L 25/78 348/77 |
| 2013/0080178 A1* | 3/2013 | Kang | G10L 15/22 704/275 |
| 2013/0085757 A1* | 4/2013 | Nakamura | G10L 15/22 704/254 |
| 2013/0111348 A1 | 5/2013 | Gruber et al. | |
| 2013/0158984 A1 | 6/2013 | Myslinski | |
| 2013/0183946 A1* | 7/2013 | Jeong | H04W 4/16 455/414.1 |
| 2013/0185078 A1 | 7/2013 | Tzirkel-Hancock et al. | |
| 2013/0252569 A1* | 9/2013 | Choi | G06F 3/167 455/404.1 |
| 2013/0253932 A1 | 9/2013 | Ariu et al. | |
| 2013/0275873 A1* | 10/2013 | Shaw | G01S 3/8006 715/716 |
| 2013/0275899 A1 | 10/2013 | Schubert et al. | |
| 2013/0339020 A1 | 12/2013 | Heo et al. | |
| 2013/0339028 A1* | 12/2013 | Rosner | G10L 15/222 704/275 |
| 2014/0028826 A1* | 1/2014 | Lee | G10L 15/25 348/77 |
| 2014/0142928 A1* | 5/2014 | Campbell | G10H 1/0091 704/201 |
| 2014/0162598 A1 | 6/2014 | Villa-Real | |
| 2014/0222436 A1* | 8/2014 | Binder | G10L 15/265 704/275 |
| 2014/0229184 A1* | 8/2014 | Shires | H04L 12/12 704/275 |
| 2014/0241540 A1 | 8/2014 | Hodges et al. | |
| 2014/0274203 A1* | 9/2014 | Ganong, III | H04W 52/0251 455/556.1 |
| 2014/0282003 A1* | 9/2014 | Gruber | G06F 3/165 715/727 |
| 2014/0303971 A1* | 10/2014 | Yi | H04M 1/605 704/233 |
| 2014/0316777 A1* | 10/2014 | Cha | G06F 3/167 704/231 |
| 2014/0379336 A1 | 12/2014 | Bhatnagar | |
| 2014/0379341 A1* | 12/2014 | Seo | G10L 15/22 704/246 |
| 2015/0032457 A1* | 1/2015 | Koo | G06F 3/165 704/275 |
| 2015/0066494 A1* | 3/2015 | Salvador | G06F 3/165 704/224 |
| 2015/0081296 A1* | 3/2015 | Lee | G10L 15/20 704/239 |
| 2015/0100322 A1* | 4/2015 | Lee | H04N 5/4403 704/275 |
| 2015/0104041 A1 | 4/2015 | Kulavik et al. | |
| 2015/0109191 A1* | 4/2015 | Johnson | G10L 15/22 345/156 |
| 2015/0119004 A1* | 4/2015 | Wang | G10L 15/26 455/414.1 |
| 2015/0134334 A1 | 5/2015 | Sachidanandam et al. | |
| 2015/0145770 A1* | 5/2015 | Hoshuyama | G06F 21/6254 345/156 |
| 2015/0154954 A1 | 6/2015 | Sharifi | |
| 2015/0161992 A1* | 6/2015 | Jung | G10L 15/083 704/251 |
| 2015/0181328 A1* | 6/2015 | Gupta | H04R 3/005 381/56 |
| 2015/0187354 A1* | 7/2015 | Kim | G10L 15/22 704/246 |
| 2015/0221305 A1* | 8/2015 | Sharifi | G10L 15/26 704/235 |
| 2015/0230171 A1* | 8/2015 | Sun | H04W 52/0209 455/41.2 |
| 2015/0248885 A1* | 9/2015 | Koulomzin | G10L 15/08 704/251 |

(56) References Cited

U.S. PATENT DOCUMENTS

| | | | |
|---|---|---|---|
| 2015/0253973 A1 | 9/2015 | Chiu et al. | |
| 2015/0254061 A1 | 9/2015 | Gelfenbeyn et al. | |
| 2015/0255071 A1* | 9/2015 | Chiba | H04M 1/72522 704/273 |
| 2015/0262458 A1* | 9/2015 | Faaborg | G08B 5/228 340/539.11 |
| 2015/0281824 A1* | 10/2015 | Nguyen | H04R 1/1041 381/74 |
| 2015/0324753 A1 | 11/2015 | Dantuluri et al. | |
| 2015/0340040 A1* | 11/2015 | Mun | G10L 17/22 704/246 |
| 2015/0347399 A1 | 12/2015 | Aue et al. | |
| 2016/0072936 A1* | 3/2016 | Kim | H04B 1/385 455/570 |
| 2016/0077794 A1* | 3/2016 | Kim | G10L 15/22 704/275 |
| 2016/0104486 A1* | 4/2016 | Penilla | B60R 16/0373 704/232 |
| 2016/0106174 A1 | 4/2016 | Chung et al. | |
| 2016/0118044 A1 | 4/2016 | Bondarev et al. | |
| 2016/0154624 A1* | 6/2016 | Son | H04W 4/80 704/235 |
| 2016/0165047 A1 | 6/2016 | Gray et al. | |
| 2016/0203700 A1* | 7/2016 | Bruhn | G08B 25/008 340/506 |
| 2016/0217790 A1* | 7/2016 | Sharifi | G10L 15/32 |
| 2016/0249852 A1* | 9/2016 | Katsu | A61B 5/11 702/19 |
| 2016/0284363 A1* | 9/2016 | Von Borstel | G10L 25/78 |
| 2016/0314782 A1* | 10/2016 | Klimanis | G10L 15/065 |
| 2016/0381450 A1 | 12/2016 | Taite et al. | |
| 2017/0011210 A1 | 1/2017 | Cheong et al. | |
| 2017/0025121 A1* | 1/2017 | Tang | G10L 15/20 |
| 2017/0025122 A1* | 1/2017 | Choi | G06F 3/0416 |
| 2017/0092084 A1 | 3/2017 | Rihn et al. | |
| 2017/0092278 A1 | 3/2017 | Evermann et al. | |
| 2017/0124836 A1 | 5/2017 | Chung et al. | |
| 2017/0125019 A1* | 5/2017 | Ganesan | H04M 1/72591 |
| 2017/0132019 A1 | 5/2017 | Karashchuk et al. | |
| 2017/0154626 A1* | 6/2017 | Kim | G10L 15/22 |
| 2017/0178001 A1 | 6/2017 | Anderson et al. | |
| 2017/0182283 A1* | 6/2017 | Palmateer | A61M 21/02 |
| 2017/0186446 A1* | 6/2017 | Wosk | G10L 25/78 |
| 2017/0187860 A1* | 6/2017 | Jeong | H04W 4/16 |
| 2017/0193982 A1* | 7/2017 | Agrawal | G06K 9/00335 |
| 2017/0219367 A1 | 8/2017 | Liu et al. | |
| 2017/0228520 A1* | 8/2017 | Kidd | G06F 19/3462 |
| 2017/0278515 A1* | 9/2017 | Lee | H04R 3/005 |
| 2017/0279957 A1* | 9/2017 | Abramson et al. | H04M 1/72577 |
| 2017/0280223 A1* | 9/2017 | Cavarra | H04R 1/1041 |
| 2017/0289676 A1* | 10/2017 | Stewart | H04R 3/12 |
| 2017/0322621 A1* | 11/2017 | Ueda | G06F 3/011 |
| 2018/0067757 A1* | 3/2018 | Rothkopf | H01H 9/00 |
| 2018/0107445 A1* | 4/2018 | Ohmura | G06F 3/16 |
| 2018/0268814 A1* | 9/2018 | SaganeGowda | G10L 15/22 |
| 2018/0342247 A1* | 11/2018 | Nicholson | G10L 15/30 |

OTHER PUBLICATIONS

Arnold S. Weksler, John Carl Mese, Nathan J. Peterson, Russell Speight Vanblon, "Situationally Suspending Wakeup Word to Enable Voice Command Input", related U.S. Appl. No. 14/872,587, Applicant's response to Non-Final Office Action filed Sep. 14, 2016.

James Anthony Hunt, Russell Speight Vanblon, John Carl Mese, Nathan J. Peterson, "Natural Language Voice Assistant", related U.S. Appl. No. 15/215,099, Non-Final Office Action dated Oct. 3, 2017.

Arnold S. Weksler, John Carl Mese, Nathan J. Peterson, Russell Speight Vanblon, "Situationally Suspending Wakeup Word to Enable Voice Command Input", file history of related U.S. Appl. No. 14/872,587, filed Oct. 1, 2015.

Ming Qian, Song Wang, "Systems and Methods for Activating a Voice Assistant and Providing an Indicator that the Voice Assistant has Assistance to Give", file history of related U.S. Appl. No. 15/217,533, filed Jul. 22, 2016.

James Anthony Hunt, Russell Speight Vanblon, John Carl Mese, Nathan J. Peterson, "Natual Language Voice Assistant", file history of related U.S. Appl. No. 15/215,099, filed Jul. 20, 2016.

Arnold S. Weksler, John Carl Mese, Nathan J. Peterson, Russel Speight Vanblon, "Situationally Suspending Wakeup Word to Enable Voice Command Input", related U.S. Appl. No. 14/872,587, Non-Final Office Action dated Sep. 8, 2016.

Russell Speight Vanblon, Arnold S. Weksler, John Carl Mese, Nathan J. Peterson, "Systems and Methods to Determine Response Cue for Digital Assistant Based on Context", related U.S. Appl. No. 15/603,892, filed May 24, 2017.

Ming Qian, Song Wang, "Systems and Methods for Activating a Voice Assistant and Providing an Indicator that the Voice Assistant has Assistance to Give", related U.S. Appl. No. 15/217,533, Final Office Action dated Feb. 9, 2018.

James Anthony Hunt, Russell Speight Vanblon, John Carl Mese, Nathan J. Peterson, "Natural Language Voice Assistant", related U.S. Appl. No. 15/215,099, Final Office Action dated Mar. 2, 2018.

James Anthony Hunt, Russell Speight Vanblon, John Carl Mese, Nathan J. Peterson, "Natural Language Voice Assistant", related U.S. Appl. No. 15/215,099, Applicant's response to Non-Final Office Action filed Dec. 15, 2017.

Ming Qian, Song Wang, "Systems and Methods for Activating a Voice Assistant and Providing an Indicator that the Voice Assistant has Assistance to Give", related U.S. Appl. No. 15/217,533, Applicant's response to Non-Final Office Action filed Dec. 12, 2017.

James Anthony Hunt, Russell Speight Vanblon, John Carl Mese, Nathan J. Peterson, "Natural Language Voice Assistant", related U.S. Appl. No. 15/215,099, Applicant's response to Non-Final Office Action filed Jul. 11, 2018.

Ming Qian, Song Wang, "Systems and Methods for Activating a Voice Assistant and Providing an Indicator that the Voice Assistant has Assistance to Give", related U.S. Appl. No. 15/217,533, Applicant's response to Final Office Action filed Apr. 23, 2018.

James Anthony Hunt, Russell Speight Vanblon, John Carl Mese, Nathan J. Peterson, "Natural Language Voice Assistant", related U.S. Appl. No. 15/215,099, Applicant's response to Final Office Action filed Apr. 23, 2018.

Ming Qian, Song Wang, "Systems and Methods for Activating a Voice Assistant and Providing an Indicator that the Voice Assistant has Assistance to Give", related U.S. Appl. No. 15/217,533, Non-Final Office Action dated Jun. 15, 2018.

James Anthony Hunt, Russell Speight Vanblon, John Carl Mese, Nathan J. Peterson, "Natural Language Voice Assistant", related U.S. Appl. No. 15/215,099, Non-Final Office Action dated Jun. 1, 2018.

Ming Qian, Song Wang, "System and Methods for Activating a Voice Assistant and Providing an Indicator That the Voice Assistant has Assistance to Give", related pending U.S. Appl. No. 15/217,533, applicant's response to non-final office action filed Sep. 11, 2018.

Ming Qian, Song Wang, "Systems and Methods for Activating a Voice Assistant and Providing an Indicator that the Voice Assistant has Assistance to Give", related U.S. Appl. No. 15/217,533, Final Office Action dated Nov. 19, 2018.

James Anthony Hunt, Russell Speight Vanblon, John Carl Mese, Nathan J. Peterson, "Natural Language Voice Assistant", related U.S. Appl. No. 15/215,099, Final Office Action dated Nov. 2, 2018.

Russell Speight Vanblon, Arnold S. Weksler, John Carl Mese, Nathan J. Peterson, "Systems and Methods to Determine Response Cue for Digital Assistant Based on Context", related U.S. Appl. No. 15/603,892, Non-Final Office Action dated Nov. 26, 2018.

Russell Speight Vanblon, Arnold S. Weksler, John Carl Mese, Nathan J. Peterson, "Systems and Methods to Determine Response Cue for Digital Assistant Based on Context", related U.S. Appl. No. 15/603,892, Applicant's response to Non-Final Office Action filed Jan. 18, 2019.

(56) References Cited

OTHER PUBLICATIONS

Vanblon et al., "Systems and Methods to Determine Response Cue for Digital Assistant Based on Context", related U.S. Appl. No. 15/603,892, Applicant's response to Final Office Action filed Aug. 1, 2019.

Vanblon et al., "Systems and Methods to Determine Response Cue for Digital Assistant Based on Context", related U.S. Appl. No. 15/603,892, Non-Final Office Action dated Aug. 21, 2019.

Russell Speight Vanblon, Arnold S. Weksler, John Carl Mese, Nathan J. Peterson, "Systems and Methods to Determine Response Cue for Digital Assistant Based on Context", related U.S. Appl. No. 15/603,892, Final Office Action dated Apr. 2, 2019.

* cited by examiner

ACTIVATING VOICE ASSISTANT BASED ON AT LEAST ONE OF USER PROXIMITY AND CONTEXT

FIELD

The present application relates generally to activating voice assistants based on at least one of user proximity and context.

BACKGROUND

As recognized herein, existing voice assistant modules in computing devices consume energy in large part because the microphone that serves as trigger to the voice assistant is in always on. For stationary plugged-in devices, power is not of operational concern, but for mobile devices it is. For this reason, mobile device voice assistant modules require a button press to energize the microphone/module. On the other hand, it can be handy to have voice assistants always ready for command input without the need for a button press.

SUMMARY

In one aspect a device includes a processor, a microphone accessible to the processor, and storage accessible to the processor. The storage bears instructions executable by the processor to, without receiving a user command to enter voice recognition mode, automatically activate the microphone responsive to a determination based on a proximity signal that a user is proximate to the device.

In examples, the instructions can be executable to, without receiving a user command to enter voice recognition mode, automatically activate a voice assistant module (VAM) of the device responsive to the determination based on the proximity signal that the user is proximate to the device.

In some example implementations, the instructions may further be executable to, without receiving a user command to enter voice recognition mode, automatically activate the microphone responsive to the determination based on the proximity signal that the user is proximate to the device and that a user context test is satisfied. In embodiments, the instructions may be executable to, without receiving a user command to enter voice recognition mode, automatically de-activate and/or maintain deactivated the microphone responsive to the determination based on the proximity signal that the user is proximate to the device and that the user context test is not satisfied. Similarly, the instructions may be executable to, without receiving a user command to enter voice recognition mode, automatically de-activate and/or maintain deactivated the microphone responsive to the determination based on the proximity signal that the user is not proximate to the device and that the user context test is satisfied.

The context test may include whether the user is asleep. The context test may require consideration of at least two input parameters.

In another aspect, a computer readable storage medium (CRSM) that is not a transitory signal includes instructions executable by a processor to activate at least one microphone associated with a voice assistant module (VAM) not by a key word being spoken or button press but responsive to a signal from a proximity sensor indicating that a user is near the microphone, and/or responsive to a determination that the user's context satisfies a context test.

In another aspect, a method includes presenting, on a display of a device, at least one user interface (UI) facilitating automatic activation and deactivation of a microphone associated with the device. The method includes, responsive to first input to the UI, automatically activating and deactivating the microphone based on user proximity to the device. The method further includes, responsive to second input to the UI, automatically activating and deactivating the microphone based on user context, and responsive to first and second input to the UI, automatically activating and deactivating the microphone based on both user proximity to the device and based on user context.

The details of present principles, both as to their structure and operation, can best be understood in reference to the accompanying drawings, in which like reference numerals refer to like parts, and in which:

DETAILED DESCRIPTION

Figure 1:
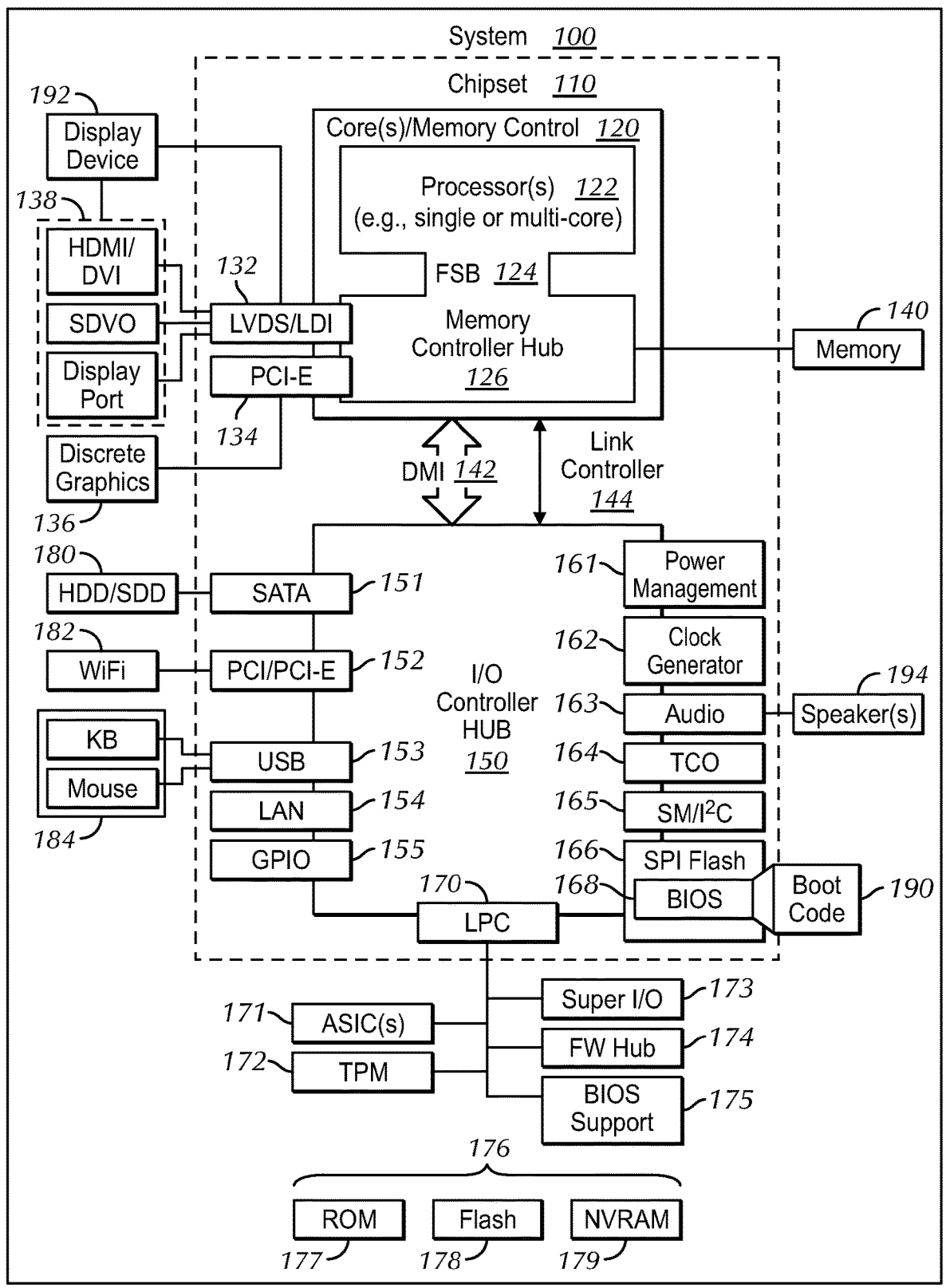
FIG. 1 is a block diagram of an example system in accordance with present principles.

The present disclosure is directed to prolonging battery life of a device while maintaining the "always on" experience of the voice assistant through the activation/deactivation of the microphone/assistant functions through machine learning and/or user's presence detection. As understood herein, presence sensors can accurately detect a user's distance to device, and a typical mobile device collects many types of data related to the user on a daily basis and stores them both on the device and in the cloud. The data can include touch events, battery level, geographic locations as indicated by, e.g., global position satellite (GPS) upload, contact info, short message service (SMS) activities, calendar events, alarm, additional sensors such as fitness and activity trackers, etc. Machine learning algorithms combined with local sensor detection can determine a person's schedule and habits. Since each user has different schedule and way of life, based on the user's routine and what is currently happening, the device can intelligently decide when a particular user would likely use the voice assistant and under what scenarios the user would not or cannot use the device/assistant, activating and deactivating the microphone and voice module accordingly.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
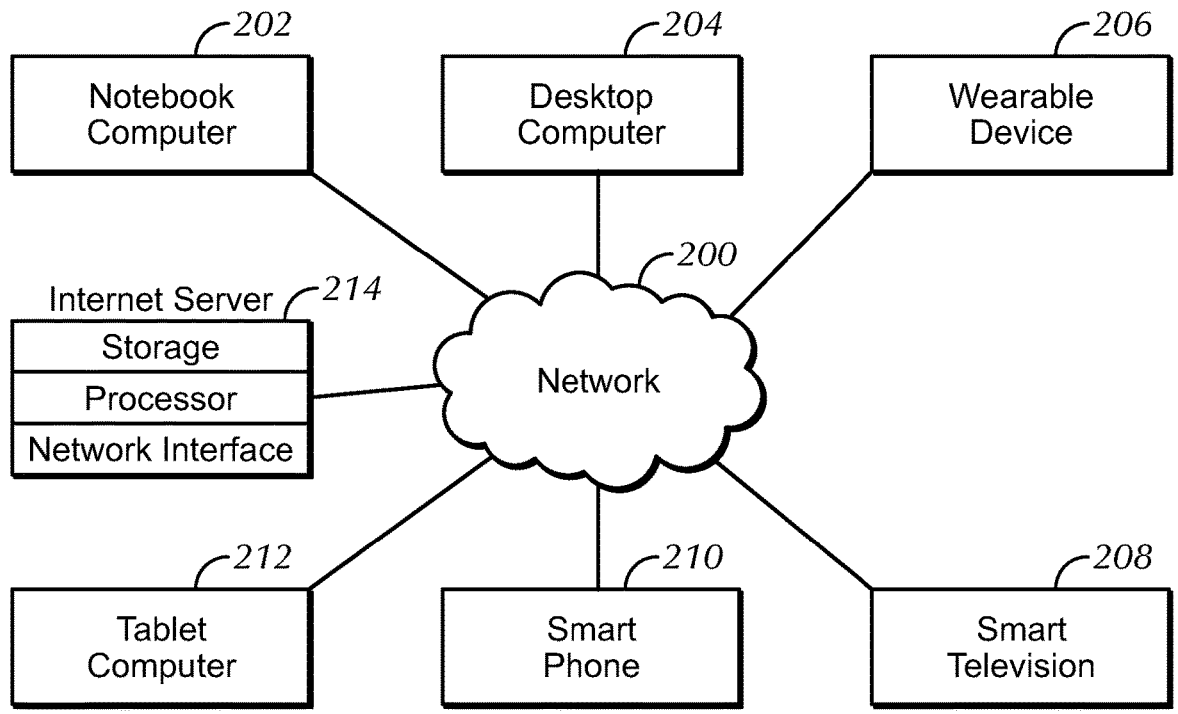
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
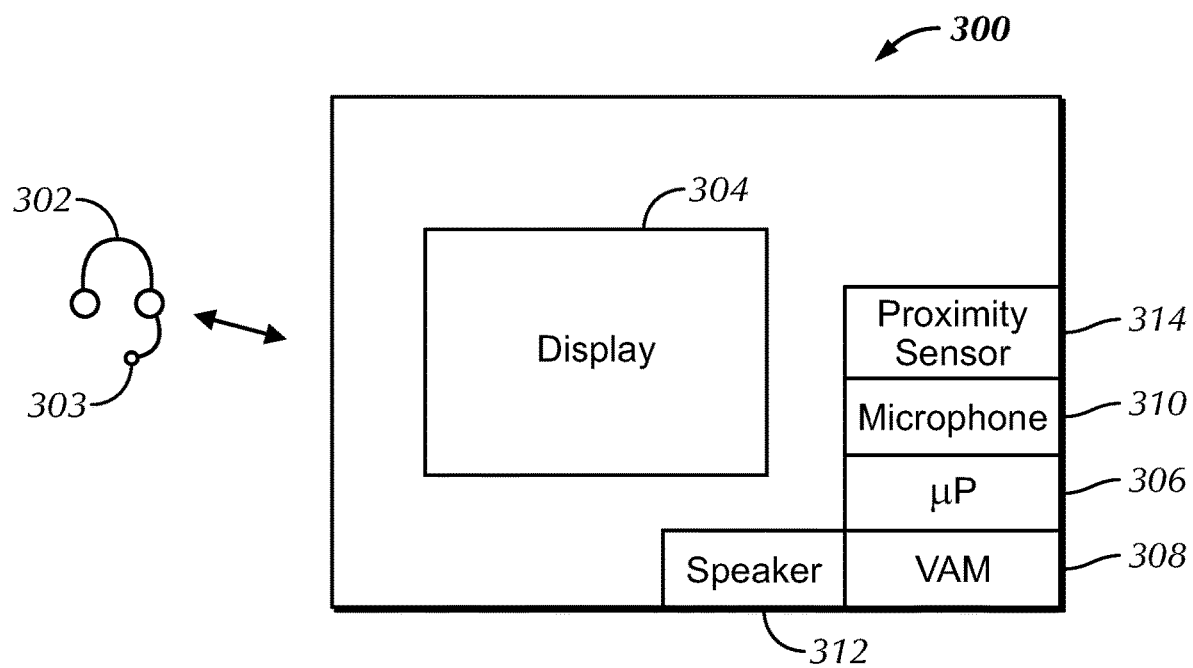
FIG. 3 is a block diagram of an example computerized device that may be implemented by any appropriate device described in FIG. 1 or FIG. 2.

Referring to FIG. 3, a block diagram of an example computerized device 300 is shown that may be implemented by any appropriate device described above. Thus, the device 300 includes one or more of the above-described components as appropriate, including one or more processors and one or more computer storage media.

The device 300 can communicate over a wired and/or wireless link with headphones 302 that may include a headphone microphone 303.

The device 300 may include a display 304 such as a touch-sensitive display. The device 300 also includes one or more processors 306 configured to execute one or more voice assistant modules (VAM) 308 for purposes of sending data from one or more microphones 310 or the headphone microphone 303 to the VAM 308 to execute voice recognition on the microphone data and to return programmatically defined responses over one or more audio speakers 312. The VAM 308 may be software stored by solid state or disk-based storage or it may include a dedicated chip or hardware module.

The device 300 may further include one or more proximity sensors 314 to sense a user's proximity to the device. The proximity sensor may be implemented by an infrared detector whose signal is analyzed by the processor of the device to determine whether a human is proximate (within an IR signal strength threshold, for instance) to the device, or the sensor 314 may be a camera images from which are analyzed by the processor employing face recognition to determine whether a particular person is recognized and based on the size of the image of the face, whether the person is within a proximity threshold of the device.

The proximity sensor 314 may be a thermal and/or heat sensor that detects body heat of a person (e.g., within a specified, predefined, and/or identified distance), which may then be analyzed by the processor of the device to determine whether a human is proximate based on whether detected heat is above a threshold, with heat above the threshold resulting in a determination that the user is proximate.

Figure 4:
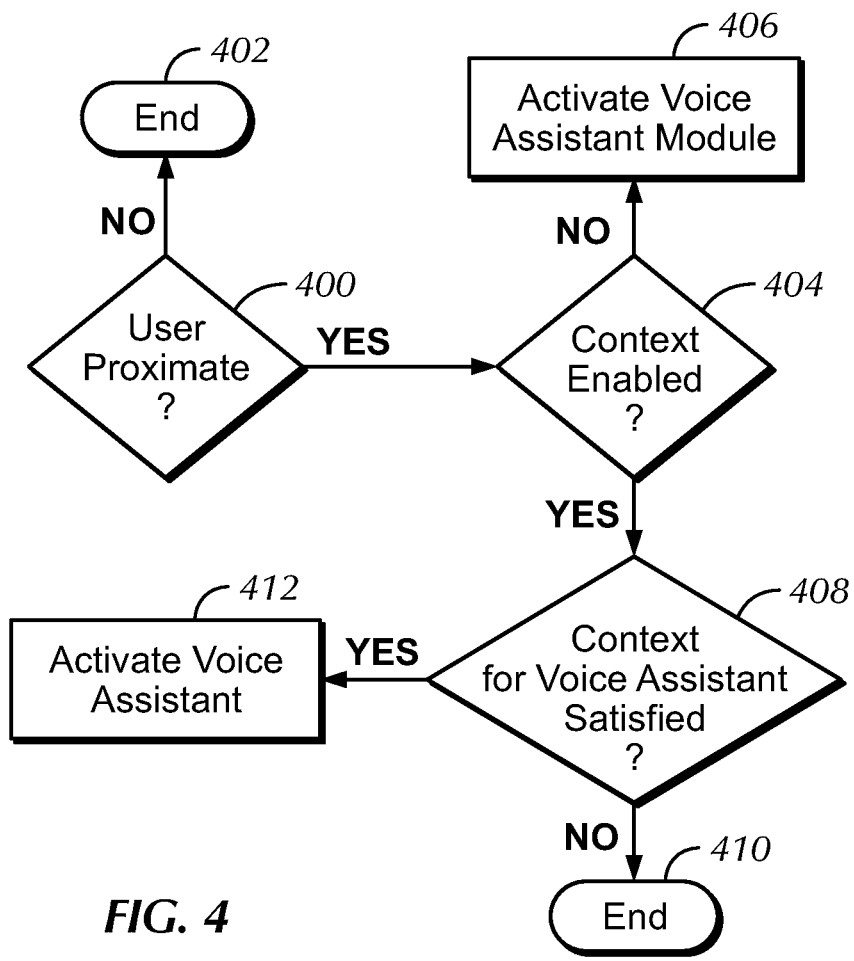
FIG. 4 is a flow chart of an example overall algorithm in accordance with present principles.

FIG. 4 illustrates overall logic. Commencing at diamond 400, without receiving a trigger command from the microphone 303/310 to enter voice assistant mode and without receiving a voice assistant entry mode command by means of a user pressing a selector on the device 300, the logic determines, using signals from the proximity sensor 314, whether a user is proximate to the device 300. If not, the logic may end at state 402.

Alternatively or in addition to determining proximity, the logic can move to diamond 404 to determine whether context VAM activation is enabled, and if not, the logic may move to block 406 to activate one or both microphones 303, 310 and the VAM 308 on the basis of the proximity test being satisfied at decision diamond 400. When context only and not proximity is used to decide whether to activate the microphones and VAM, a negative test at diamond 404 would result in deactivating the microphones and VAM.

Continuing with the example shown in FIG. 4, when both proximity and context are implemented for deciding whether to activate one or both microphones and the associated VAM, a positive test at diamond 404 causes the logic to move to diamond 408. At diamond 408 it is determined whether the context for activating the microphones/VAM has been satisfied. If not, the process ends at state 410 to deactivate or maintain the microphones and VAM de-energized, but otherwise the logic activates the microphones and associated VAM at block 412.

As an example of context-based microphone/VAM activation, recognizing that people will not use VAMs while sleeping but nonetheless may be proximate to the device, when the logic deduces that a person is asleep the test at diamond 408 is negative and the microphones/VAM are de-energized to save power. The sleep time can be deduced through a machine learning algorithm from data found through a combination of device and sensor data analysis (some data that can be used during analysis includes calendar events, GPS locations, biometric sensor data, etc.). The microphone and assistant function can be deactivated during predicted sleep time and re-activated during predicted wake up time to significantly preserve power. The learning of the user's habit and schedule can be done unobtrusively and during the learning stage the device may not attempt to deactivate the microphone/assistant features until some confidence level can be reached. Note that a proactive trigger method such as button press can be preserved for fail safe purposes.

With greater specificity, assume that GPS location data of the device remains unchanged for a period in excess of a threshold keyed to a typical minimum sleep period, for instance, four hours. Assume that such constancy of GPS location data is observed over time to occur between midnight and 4 A.M. for a threshold percentage of days, e.g., for nine out of ten days. The present logic can infer that the test at diamond 408 should be negative between the hours of midnight and 4 A.M. provided GPS location data remains unchanged, with the test at diamond 408 turning positive before midnight or after 4 A.M. or upon GPS data indicating that the location of the person has changed by greater than a threshold distance, for instance, fifty yards, to ensure that the test does not incorrectly turn positive simply because the person woke temporarily to get a drink of water.

Other heuristic machine-learning tests that may be used include, instead of or in addition to using GPS data, receiving data from a biometric sensor worn by the user and based on that, inferring whether the user is active or asleep. For example, should a heart rate sensor indicate low pulse for a period in excess of a threshold, it may be inferred that the user is asleep or otherwise torpid and thus likely not in need of a voice assistant, in which case the test at diamond 408 is negative. Data from a sleep sensor may also be used to determine if the user is sleeping.

As another example, it may be inferred that a user is active as opposed to asleep based on user input received at the device, such as input to launch an application, input to send a text message, or input to illuminate the display to ascertain the current time of day.

A time that an alarm is to be provided at the device may also be used to infer that a user is asleep, such as if a current time of day identified by the device is between a first time each night the user typically goes to sleep (e.g., as learned over time) and a second time at which the alarm is to be provided.

As yet another example, certain calendar entries may result in negative tests at diamond 408 and certain other calendar entries may result in positive tests. Examples of the former include "meeting" and "workout" while examples of the latter include "work" and "study".

In any case, the decision at diamond 408 may rely on only a single parameter or on two or more parameters analyzed in cooperation. A voice module can be implemented by a microphone plus related VAM software/VAM dedicated chip or other hardware module.

Figure 5:
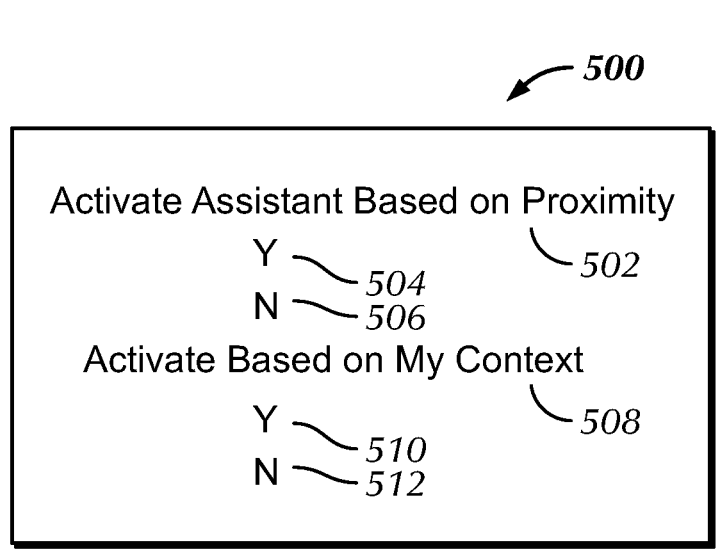
FIG. 5 is a screen shot of an example user interface (UI) for implementing present principles.

FIG. 5 illustrates an example user interface (UI) 500 that can be presented on the display 304 of the device 300 to enable a user to define automatic activation and deactivation criteria for the microphones/VAM. As indicated at 502, the user may be prompted to select to implement the proximity test at diamond 400 by manipulating a yes selector 504 or to decline to implement the proximity test at diamond 400 by means of the no selector 506. Similarly, as indicated at 508 the user may be prompted to select to implement the context test at diamond 404 by manipulating a yes selector 510 or to decline to implement the context test at diamond 404 by means of the no selector 512.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a microphone accessible to the at least one processor; and
   storage accessible to the at least one processor and bearing instructions executable by the at least one processor to:
   without receiving a user command to enter voice recognition mode and based on a setting being enabled to activate the microphone and a voice assistant module (VAM) based on biometric information related to a user, automatically activate the microphone and the VAM based on predicted sleep times and predicted wake up times determined from the biometric information, the biometric information indicating at least one respective sleep time and/or at least one respective wake up time of the user;

wherein the instructions are executable to:

predict a first sleep time and a first wake up time of the user using a machine learning algorithm and data from a biometric sensor in communication with the device, the data related to a biometric of the user;

based on the setting being enabled, automatically deactivate the microphone and the VAM based on the first sleep time of the user; and based on the setting being enabled, automatically activate the microphone and the VAM based on the first wake up time of the user.

2. The device of claim 1, wherein the instructions are executable by the at least one processor to:

without receiving a user command to enter voice recognition mode, automatically activate the microphone based on a determination that the user is proximate to the device.

3. The device of claim 2, wherein the instructions are executable by the at least one processor to:

without receiving a user command to enter voice recognition mode, automatically activate the microphone based on the determination that the user is proximate to the device and that a user context test is satisfied, the user context test being satisfied at least in part based on input to launch an application.

4. The device of claim 3, wherein the instructions are executable by the at least one processor to:

without receiving a user command to enter voice recognition mode, automatically deactivate the microphone and/or maintain deactivated the microphone based on the determination that the user is proximate to the device and that the user context test is not satisfied.

5. The device of claim 1, wherein the instructions are executable to:

without receiving a user command to enter voice recognition mode, automatically activate the microphone based on identification of a first entry in an electronic calendar; and decline to automatically activate the microphone based on identification of a second entry in the electronic calendar, the second entry being different from the first entry.

6. The device of claim 5, wherein the second entry relates to a meeting or workout.

7. The device of claim 6, wherein the first entry relates to work or study.

8. The device of claim 5, wherein the first entry relates to work or study.

9. The device of claim 1, wherein the instructions are executable to:

without receiving a user command to enter voice recognition mode, automatically activate the microphone responsive to input to send a text message.

10. The device of claim 1, wherein the instructions are executable to:

present a user interface (UI) on a display accessible to the at least one processor, the UI comprising a selector that is selectable to enable the setting.

11. A computer readable storage medium (CRSM) that is not a transitory signal, the computer readable storage medium comprising instructions executable by a processor of a device to:

based on a setting being enabled to activate at least one microphone and a voice assistant module (VAM) not by a key word being spoken or button press but based on biometric information related to a user, automatically activate the at least one microphone and the VAM based on predicted sleep times and predicted wake up times determined from the biometric information, the biometric information indicating at least one respective sleep time and/or at least one respective wake up time of the user;

wherein the instructions are executable to:

predict a first sleep time and a first wake up time of the user using a machine learning algorithm and data from a biometric sensor, the data related to a biometric of the user;

based on the setting being enabled, automatically deactivate the at least one microphone and the VAM based on the first sleep time of the user; and based on the setting being enabled, automatically activate the at least one microphone and the VAM based on the first wake up time of the user.

12. The CRSM of claim 11, wherein the instructions are executable to:

present a user interface (UI) on a display accessible to the at least one processor, the UI comprising a selector that is selectable to enable the setting.

13. The CRSM of claim 11, wherein the instructions are executable to:

activate the at least one microphone, not by a key word being spoken or button press, but based on identification of a first entry in an electronic calendar; and decline to activate the at least one microphone based on identification of a second entry in the electronic calendar, the second entry being different from the first entry.

14. The CRSM of claim 13, wherein the second entry relates to a meeting or workout.

15. The CRSM of claim 14, wherein the first entry relates to work or study.

16. The CRSM of claim 11, wherein the instructions are executable to:

activate the at least one microphone, not by a key word being spoken or button press, but responsive to input to send a text message.

17. A method, comprising:

based on a setting of a device being enabled to activate at least one microphone and a voice assistant module (VAM) based on biometric information related to a user, automatically activating the at least one microphone and the VAM based on predicted sleep times and predicted wake up times determined from the biometric information, the biometric information indicating at least one respective sleep time and/or at least one respective wake up time of the user;

wherein the method comprises:

predicting a first sleep time and a first wake up time of the user using a machine learning algorithm and data from a biometric sensor, the data related to a biometric of the user;

based on the setting being enabled, automatically deactivating the at least one microphone and the VAM based on the first sleep time of the user; and based on the setting being enabled, automatically activating the at least one microphone and the VAM based on the first wake up time of the user.

18. The method of claim 17, comprising: presenting a user interface (UI) on a display, the UI comprising a selector that is selectable to enable the setting.

19. The method of claim 17, comprising:
- without receiving a user command to enter voice recognition mode, automatically activating the microphone based on identification of a first entry in an electronic calendar; and
- declining to automatically activate the microphone based on identification of a second entry in the electronic calendar, the second entry being different from the first entry.

20. The method of claim 17, comprising:
- without receiving a user command to enter voice recognition mode, automatically activating the microphone responsive to input to send a text message.

* * * * *